(12) United States Patent
Chung et al.

(10) Patent No.: US 9,676,034 B2
(45) Date of Patent: Jun. 13, 2017

(54) METHOD OF MANUFACTURING POWDER HAVING HIGH SURFACE AREA

(71) Applicant: Research & Business Foundation Sungkyunkwan University, Suwon-si (KR)

(72) Inventors: Chan-Hwa Chung, Seoul (KR); Myung Gi Jeong, Seoul (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 397 days.

(21) Appl. No.: 14/353,070

(22) PCT Filed: Oct. 23, 2012

(86) PCT No.: PCT/KR2012/008692
§ 371 (c)(1),
(2) Date: Apr. 21, 2014

(87) PCT Pub. No.: WO2013/065984
PCT Pub. Date: May 10, 2013

(65) Prior Publication Data
US 2014/0283650 A1     Sep. 25, 2014

(30) Foreign Application Priority Data

Nov. 1, 2011 (KR) .................. 10-2011-0112732

(51) Int. Cl.
*B22F 9/24* (2006.01)
*C22C 1/04* (2006.01)
(Continued)

(52) U.S. Cl.
CPC .............. *B22F 9/24* (2013.01); *B22F 1/02* (2013.01); *C22C 1/0433* (2013.01);
(Continued)

(58) Field of Classification Search
None
See application file for complete search history.

(56) References Cited

U.S. PATENT DOCUMENTS 4,582,585 A * 4/1986 Ray .................. C25C 7/025
                                                204/245
4,999,097 A * 3/1991 Sadoway .......... C25C 3/08
                                              204/247.3

(Continued)

FOREIGN PATENT DOCUMENTS

JP    1991-050147 A    3/1991
JP    04-35882 A    12/1992
(Continued)

OTHER PUBLICATIONS

Xiao, Feng, et al. "Synthesis of Bi2Te3 nanotubes by galvanic displacement," *Journal of the American Chemical Society*, vol. 129, No. 33, May 8, 2007, pp. 10068-10069.
(Continued)

*Primary Examiner* — George Wyszomierski
(74) *Attorney, Agent, or Firm* — NSIP Law

(57) ABSTRACT

A method of manufacturing a powder having a high surface area is provided. According to the method of manufacturing a powder having a high surface area, a metal electrolyte in which metal ions of different kinds of first metals are dissociated is prepared. Subsequently, a metal alloy powder formed of the first metals is formed by soaking a second metal having a higher reducing power than the first metals in the metal electrolyte to induce a first spontaneous substitution reaction. Therefore, it is possible to form a powder having an improved specific surface area.

18 Claims, 15 Drawing Sheets

(51) Int. Cl.
  *C22C 5/02*  (2006.01)
  *C22C 5/04*  (2006.01)
  *C22C 19/03* (2006.01)
  *B22F 1/02*  (2006.01)
  *B82Y 30/00* (2011.01)

(52) U.S. Cl.
  CPC .............. *C22C 1/0466* (2013.01); *C22C 5/02* (2013.01); *C22C 5/04* (2013.01); *C22C 19/03* (2013.01); *B82Y 30/00* (2013.01)

(56) References Cited

U.S. PATENT DOCUMENTS

| 7,507,477 B2* | 3/2009 | Kubota | B22F 1/025 |
| | | | 427/212 |
| 2009/0137115 A1* | 5/2009 | Jeong | C23C 18/165 |
| | | | 438/643 |

FOREIGN PATENT DOCUMENTS

| JP | 2009-155122 A | 7/2009 |
| KR | 10-2001-0040546 A | 5/2001 |

OTHER PUBLICATIONS

Lee, Chien-Liang, et al. "High activity of hexagonal Ag/Pt nanoshell catalyst for oxygen electroreduction," *Nanoscale research letters*, vol. 4, No. 3, Dec. 4, 2008, pp. 193-196.

Lang, X. Y., et al. "Novel Nanoporous Au—Pd Alloy with High Catalytic Activity and Excellent Electrochemical Stability," *The Journal of Physical Chemistry C*, vol. 114, No. 6, Jan. 4, 2010, pp. 2600-2603.

Djokić, Stojan S. "Electroless deposition of metals and alloys," *Journal of the Electrochemical Society*, Springer US, 2011, pp. D204-D209.

* cited by examiner

METHOD OF MANUFACTURING POWDER HAVING HIGH SURFACE AREA

CROSS-REFERENCE TO RELATED APPLICATIONS

This application is a National Phase Entry of International Patent Application No. PCT/KR2012/008692, filed on Oct. 23, 2012, which claims priority under 35 UCS §119 to Korean Patent Application No. 10-2011-0112732 filed on Nov. 1, 2011, the contents of which are herein incorporated by reference in its entirety.

BACKGROUND OF THE INVENTION

1. Field of the Invention

Example embodiments of the present invention relate to a method of manufacturing a powder having a high surface area. More particularly, example embodiments of the present invention relate to a method of manufacturing a powder having a high surface area capable of being used in an electrode included in electronic equipment and increasing a specific surface area so as to improve electrical characteristics of the electrode.

2. Description of the Related Art

In recent years, active research on a method of manufacturing an electrode for energy storage devices such as catalysts, solar cells, fuel cells, lithium secondary batteries and super-capacitors in chemical sensors, gas sensors and bio-sensors, and a method of manufacturing metal and metal oxide particles in the field of electrics & electronics such as electromagnetic wave shielding and absorbing agents has been conducted.

For example, studies to produce clean hydrogen energy having excellent economic feasibility and effectiveness and apply the hydrogen energy to hydrogen fuel cells using fine metal particles have been conducted to develop new & renewable energy in order to preserve the global environments. With the growing importance of the metal oxide particles as a cathode active material of the lithium secondary battery, studies to improve performance through structural control have also been conducted actively. In addition, the super-capacitor receiving attention as a next-generation secondary battery has been used as the concept of an auxiliary power unit using a typical carbonaceous material. However, as research on a pseudo-capacitor using a metal oxide electrode replaceable for the lithium secondary battery is being currently conducted, various studies to expand surface areas of a metal electrode and a metal oxide electrode has also been conducted. Research and development of a dye-sensitized solar cell or a thin-film solar cell using metal nanoparticles has been carried out to improve energy conversion efficiency in the field of solar cells. Also, there is active research conducted to enhance specific surface areas of various gas sensors, sensors for detecting chemicals, or bio-sensors for use as an electrode and a catalyst. Especially as bad effects of harmful electromagnetic waves caused with current development of various kinds of portable electronic equipment have been raised as a serious social issue, ardent research using metal particles has been conducted to effectively shield or absorb the electromagnetic wave.

However, such metal particles or metal oxide particles has problems in that they are mainly present in a particulate shape converted from a bulky shape by a physical or chemical method, or lots of the manufacturing cost and process time caused by use of various kinds of vacuum equipment and a method including multi-step processes are required to manufacture the particles. Therefore, the metal particles or metal oxide particles remains to be improved.

For example, as methods of manufacturing a micro- or nano-sized metal powder, a mass-production process using an electrical wire explosion through application of high-voltage electric energy, a manufacturing method using a current mode in a vacuum, a physical production method that is a top-down technology, a gas evaporation/condensation method undergoing heating, cooling and condensation processes, a synthesis method using a mechanical mixing process, etc. have been currently developed. These methods have problems in that the micro- or nano-sized metal powder is manufactured through very complicated processes, but does not have a high specific surface area as a metal powder having small spherical, linear and belt-type shapes. Therefore, to solve these problems, research conducted to increase a specific surface area of the metal particles under the control of the structure of the metal particles to maximize performance is required to solve the above problems. Also, methods in which the metal and metal oxide particles are manufactured with the relatively low cost and through minimum processes are essentially required.

SUMMARY OF THE INVENTION

Example embodiments of the present invention are directed to a method of manufacturing a powder having a high surface area capable of increasing a specific surface area.

According to an aspect of the present invention, there is provided a method of manufacturing a powder having a high surface area. Here, the method includes preparing a metal electrolyte which includes different kinds of first metals and in which metal ions are dissociated, and extracting an alloy powder formed of the first metals by soaking a second metal having a higher reducing power than the first metals in the metal electrolyte to induce a first spontaneous substitution reaction.

According to one exemplary embodiment of the present invention, the metal electrolyte may contain chloride ions. Here, the metal electrolyte may be prepared by preparing metal chlorides, each of which include the different kinds of first metals, and dissociating the metal chlorides in a first solution. Alternatively, the metal electrolyte may be prepared by preparing the different kinds of first metals, and dissociating the first metals in a second solution in which the chloride ions are dissociated. For example, the second solution may be prepared by dissociating sodium chloride, ammonium chloride, hydrochloric acid or a mixture thereof in deionized water.

According to one exemplary embodiment of the present invention, at least one of the first metals may be removed from the alloy powder. Here, the metal electrolyte may contain a strong acid, and at least one of the first metals may be removed from the alloy powder by allowing the at least one of the first metals to react with the strong acid. Alternatively, the alloy powder may be dried, and at least one of the first metals may be removed from the alloy powder by allowing the dried alloy powder to react with the strong acid. Also, at least one of the first metals may be removed from the alloy powder by subjecting the dried alloy powder to an electrochemical process.

According to one exemplary embodiment of the present invention, an additive for improving a structure and directionality of the alloy powder and modifying a surface of the alloy powder may be mixed with the metal electrolyte. Here, the additive may include polyoxometalate (POM), vanadyl sulfate (VOSO$_4$), polyvinylpyrrolidone, acetic acid, hexadecyltrimethylammonium bromide (CTAB), polydiallyldimethylammonium chloride (PDDA), sodium dodecyl sulfate (SDS), or a mixture thereof.

According to one exemplary embodiment of the present invention, when the second metal contains aluminum, the different kinds of first metals may contain at least two selected from the group consisting of copper, zinc, titanium, nickel, lead, tin, manganese, cobalt, ruthenium, vanadium, gold, silver and platinum.

According to one exemplary embodiment of the present invention, the second metal may be soaked in the metal electrolyte in the form of a thin film or powder.

According to one exemplary embodiment of the present invention, a third solution in which a third metal having a lower reducing power than the first metals is dissociated may be prepared, and a core/shell metal material in which the alloy powder formed of the first metals is surrounded by the third metal may be formed by soaking the alloy powder in the third solution to induce a second spontaneous substitution reaction between the third metal and the first metals.

According to one exemplary embodiment of the present invention, a metal oxide layer may be formed on a surface of the alloy powder. Here, the metal oxide layer may be formed by thermally treating the alloy powder under an oxygen atmosphere. On the other hand, the metal oxide layer may be formed by injecting oxygen ions in a plasma phase into the alloy powder.

According to one exemplary embodiment of the present invention, the alloy powder may have a dendritic shape, a projection-type shape, a tubular shape, a particle aggregate shape, a needle-type shape, or a mixed shape thereof.

According to a method of manufacturing a powder having a high surface area according to exemplary embodiments of the present invention, a powder having a high surface area, which has an improved specific surface area, can be manufactured in a relatively short processing time through simple processes by manufacturing electrodes through a spontaneous substitution reaction using a difference in reducing power of metals and a reaction activation process using other materials formed in an electrolyte containing chloride ions. As a result, a powder whose specific surface area is improved 5 to 30 times or more that of the conventional projection-type dendritic powder may be manufactured.

Accordingly, the powder having a high surface area can be used in large-scale and flexible substrates, and can also be useful in improving performance of catalysts and sensors, and capacitance and energy density/output density of energy storage systems through an increase in specific surface areas of metals. Also, the powder having a high surface area can have an effect of maximizing use in other fields including fuel cells, solar cells, electromagnetic wave shielding and absorbing agents, and various catalysts and sensors.

BRIEF DESCRIPTION OF THE DRAWINGS

The above and other features and advantages of the present invention will become more apparent by describing in detailed exemplary embodiments thereof with reference to the accompanying drawings, in which.

DESCRIPTION OF THE EMBODIMENTS

Hereinafter, exemplary embodiments of the present invention will be described in detail. However, the present invention is not limited to the embodiments disclosed below, but can be implemented in various forms. The following embodiments are described in order to enable those of ordinary skill in the art to embody and practice the present invention. With reference to the appended drawings, exemplary embodiments of the present invention will be described in detail below. To aid in understanding the present invention, like numbers refer to like elements throughout the description of the figures, and the description of the same elements will be not reiterated.

Although the terms first, second, etc. may be used to describe various elements, these elements are not limited by these terms. These terms are only used to distinguish one element from another. For example, a first element could be termed a second element, and, similarly, a second element could be termed a first element, without departing from the scope of exemplary embodiments. The term "and/or" includes any and all combinations of one or more of the associated listed items.

The terminology used herein is for the purpose of describing particular embodiments only and is not intended to be limiting of exemplary embodiments. The singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, components and/or groups thereof, but do not preclude the presence or addition of one or more other features, integers, steps, operations, elements, components and/or groups thereof.

Figure 1:
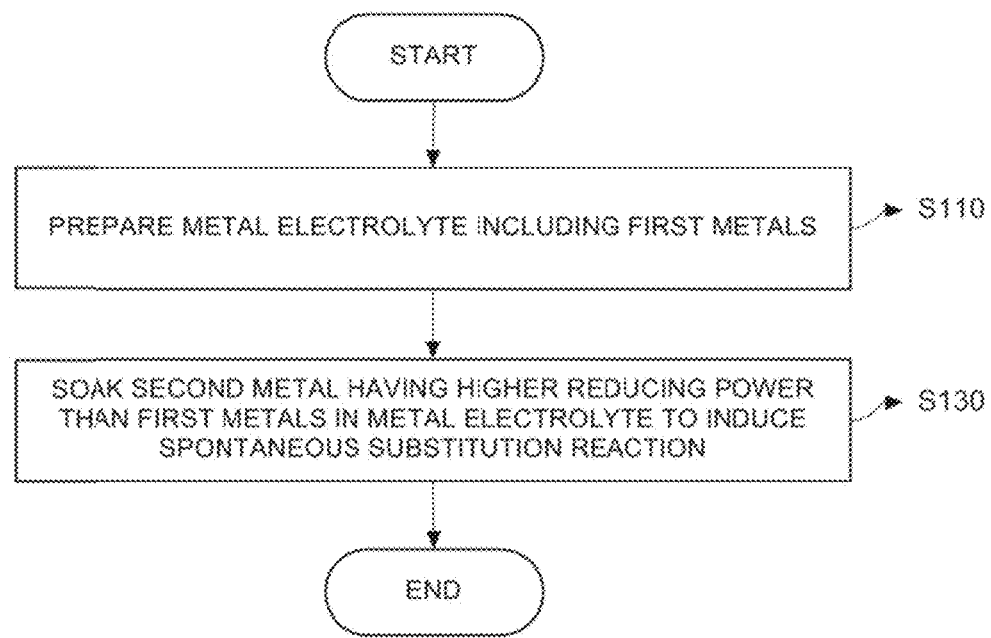
FIG. 1 is a flowchart for describing a method of manufacturing a powder having a high surface area according to one exemplary embodiment of the present invention.

FIG. 1 is a flowchart for describing a method of manufacturing a powder having a high surface area according to one exemplary embodiment of the present invention.

In the method of manufacturing a powder having a high surface area according to exemplary embodiments of the present invention, first, a metal electrolyte including different kinds of first metals is prepared (S110).

The first metals may include a material having a relatively high oxidizing power. That is, the first metals may include a material having a relatively low reducing power. For example, when the second metal contains aluminum, examples of the first metals may include at least two selected from the group consisting of copper, zinc, titanium, nickel, lead, tin, manganese, cobalt, ruthenium, vanadium, gold, silver, and platinum.

According to one exemplary embodiment of the present invention, the metal electrolyte may contain chloride ions.

To prepare the metal electrolyte containing the chloride ions, at least two different kinds of metal chlorides selected from the group consisting of tin chloride, copper chloride, nickel chloride, ruthenium chloride, lead chloride, silver chloride, and a mixture thereof are prepared. Thereafter, the metal chlorides may be dissociated in a first solution so that at least two different kinds of dissociated metal ions and chloride ions can be included in the metal electrolyte. Examples of the first solution may include deionized water.

Alternatively, to prepare the metal electrolyte containing the chloride ions, a second solution is prepared by dissociating sodium chloride, ammonium chloride, hydrochloric acid or a mixture thereof in the deionized water. In the second solution, the chloride ions are present in a dissociated state. When the first metals are soaked in the second solution, the first metals may be present in an ionized state in the second solution.

Next, a second metal having a higher reducing power than the first metals is soaked in the metal electrolyte (S130). Since the second metal has a higher reducing power than the first metals, a first spontaneous substitution reaction may occur in the metal electrolyte. In this case, the second metal is oxidized and dissociated in the electrolyte, and first metal ions dissociated in the metal electrolyte are reduced into different kinds of first metals. As a result, a powder having a high surface area which is composed of the different kinds of first metals may be manufactured.

The first spontaneous substitution reaction may occur even at room temperature. Therefore, a hydrothermal synthesis process using an autoclave generally occurs at a high temperature of 100° C. or higher, but the first spontaneous substitution reaction has an advantage in that it occurs at room temperature. In addition, the first spontaneous substitution reaction has an advantage in that a reaction rate of the first spontaneous substitution reaction is approximately 5 times or higher that of the hydrothermal synthesis process.

Meanwhile, an electroless plating process may occur when a generally required oxidizing or reducing agent is supplied in the electrolyte, but the first spontaneous substitution reaction may occur easily without separately supplying the oxidizing agent or reducing agent.

The second metal may be sufficiently used as long as it has a higher reducing power than the first metals. For example, the second metal may contain aluminum. Since the aluminum may be purchased at a relatively low cost, economic feasibility of this process may be ensured. When the second metal contains aluminum, the first metals may include at least two kinds of metals selected from the group consisting of copper, zinc, titanium, nickel, lead, tin, manganese, cobalt, ruthenium, vanadium, gold, silver, and platinum.

The second metal may be present in the form of a thin film or powder. That is, the second metal may be soaked in the metal electrolyte in the form of foil. Also, the second metal may be soaked in the form of powder in the metal electrolyte. Further, the shape of the second metal may be freely adjusted.

According to one exemplary embodiment of the present invention, a de-alloying process of partially removing at least one of the first metals from the alloy powder may be further performed. Accordingly, the surface area of the alloy powder having a specific surface area may be further increased through the de-alloying process.

For example, when the first metals are nickel and copper, a powder having a high surface area, which is composed of a nickel/copper alloy containing nickel and copper maybe manufactured through the first spontaneous substitution reaction. When the nickel/copper alloy is exposed to a strong acid, the copper having a lower corrosion resistance than the nickel may be partially or completely removed from the nickel/copper alloy. As a result, the powder metal may have an improved specific surface area.

According to one exemplary embodiment of the present invention, the metal electrolyte may include a strong acid, and one of the first metals may be removed by soaking the alloy powder in the metal electrolyte.

According to one exemplary embodiment of the present invention, one of the first metals may be removed by drying the alloy powder and allowing the dried alloy powder to react with a strong acid. Alternatively, one of the first metals may be removed by subjecting the dried alloy powder to an electrochemical process.

According to one exemplary embodiment of the present invention, an additive may be mixed with the metal electrolyte. The additive may serve to improve a structure and directionality of the alloy powder and modify a surface of the alloy powder. The additive may include polyoxometalate (POM), vanadyl sulfate ($VOSO_4$), polyvinylpyrrolidone, acetic acid, hexadecyltrimethylammonium bromide (CTAB), polydiallyldimethylammonium chloride (PDDA), sodium dodecyl sulfate (SDS), or a mixture thereof.

According to one exemplary embodiment of the present invention, a third solution in which a third metal having a lower reducing power than the first metals is dissociated may be prepared. For example, when the first metals include copper and nickel, the third metal may include silver, platinum, gold or an alloy thereof. Here, the third metal may be a material having a relatively high electrical conductivity. The third solution may be prepared by dissociating gold, silver or a mixture thereof in the first solution. Alternatively, the third solution may be prepared by dissociating gold, silver or a mixture thereof in a strong acid solution.

Subsequently, the powder having a high surface area, which is composed of the first metals, is soaked in the third solution in which the third metal is dissociated. As a result, a second spontaneous substitution reaction occurs. That is, an oxidation reaction in which at least one of the first metals is dissociated at a surface of the powder having a high surface area, which is composed of the first metals produced in the first spontaneous substitution reaction, occurs, and a reduction reaction in which ions of the third metal are reduced at a surface of the powder having a high surface area powder occurs. Therefore, a core/shell metal material in which the third metal surrounds a surface of the powder having a high surface area is formed. As a result, the core/shell metal material may have improved electrical conductivity, compared to the powder having a high surface area, which is composed of the first metals.

According to one exemplary embodiment of the present invention, a metal oxide layer may be further formed on a surface of the alloy powder. In this case, the metal oxide layer may be formed by thermally treating the alloy powder under an oxygen atmosphere. Alternatively, the metal oxide layer may be formed by injecting oxygen ions in a plasma state into the alloy powder.

Example 1: Manufacture of Powder Having a High Surface Area Using Nickel/Copper Alloy (I)

(1) 100 ml of an electrolyte including 0.2 M $NiCl_2 \cdot 6H_2O$, 0.01 M $CuSO_4 \cdot 5H_2O$ and 1M $H_2SO_4$ was used to manufacture a powder having a high surface area.

(2) Aluminum powder was used as a second metal. In this case, an oxide film formed on a surface of the aluminum powder was slowly removed at the presence of sulfuric acid in the electrolyte, and a nickel/copper alloy powder having a dendritic shape, a particle aggregate shape or a mixed shape thereof was manufactured through a first spontaneous substitution reaction. In this case, the sizes and shapes of dendrite and particles may be adjusted according to the concentrations of the metal material and sulfuric acid (see FIGS. 2A and 2B).

Meanwhile, copper was preferentially removed from the nickel/copper alloy powder through an oxidation reaction using sulfuric acid as a de-alloying process, such that a plurality of holes were formed in the nickel/copper alloy. Next, after a washing process using distilled water, the nickel/copper alloy was filtered through a filter having a pore size of 200 nm, and dried at a temperature of 70° C. for 12 hours in a vacuum oven to manufacture nickel/copper alloy powder electrode (see FIGS. 2C and 2D). Alternatively, after the drying process, copper was able to be partially removed from the nickel/copper alloy by means of sulfuric acid and another material for removing copper by subjecting the nickel/copper alloy to the de-alloying process in a state of an aqueous solution.

Figure 2A:
FIGS. 2A to 2D are scanning electron microscope (SEM) images showing a powder having a high surface area manufactured in Example 1 of the present invention.
Figure 2B:
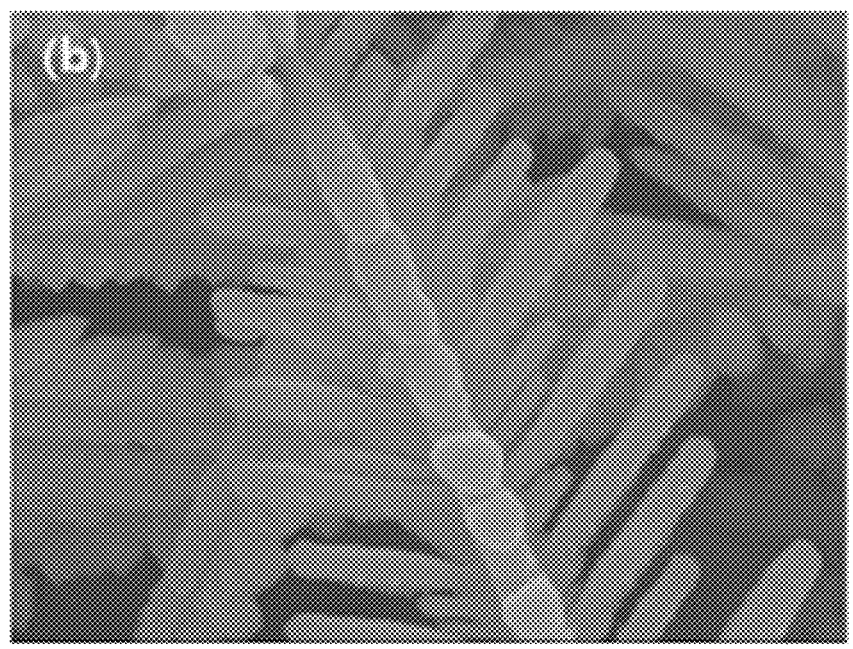
Figure 2C:
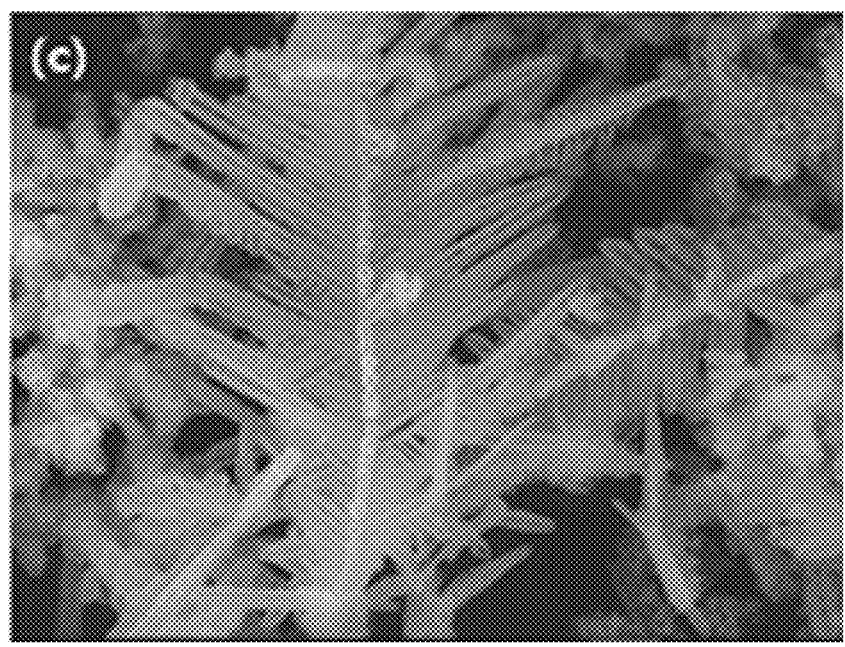
Figure 2D:
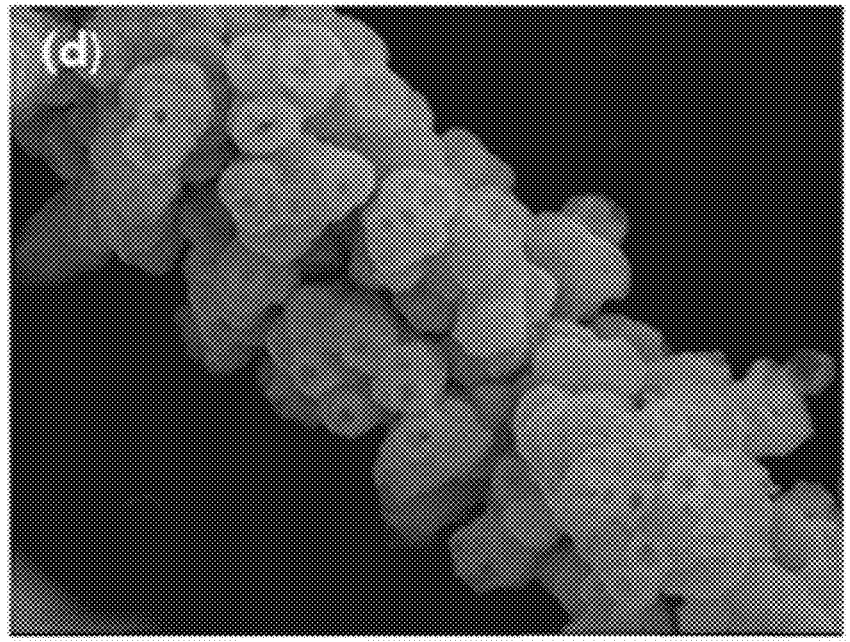

FIGS. 2A to 2D are SEM images showing the powder having a high surface area manufactured in Example 1 of the present invention. As shown in FIGS. 2A and 2B, it could be seen that the nickel/copper alloy powder electrode manufactured through the first spontaneous substitution process in the method as described above had a relatively high content of copper components. As shown in FIGS. 2C and 2D, it could be seen that the electrode having a high specific surface area was formed, which had a porous structure in which the copper components were removed through the de-alloying process so that a plurality of pores were formed.

Example 2: Manufacture of Powder Having a High Surface Area Using Nickel/Copper Alloy (II)

A power having a high surface area was manufactured in substantially the same manner as in Example 1, except that aluminum foil was used instead of the aluminum powder. In this case, the aluminum foil had a thickness 0.13 μm and an area of 3.5 cm×3.5 cm, and an aluminum oxide film was removed in a NaOH solution for approximately 2 minutes.

FIGS. 3A to 3D are SEM images showing the powder having a high surface area manufactured in Example 2 of the present invention.

Figure 3A:
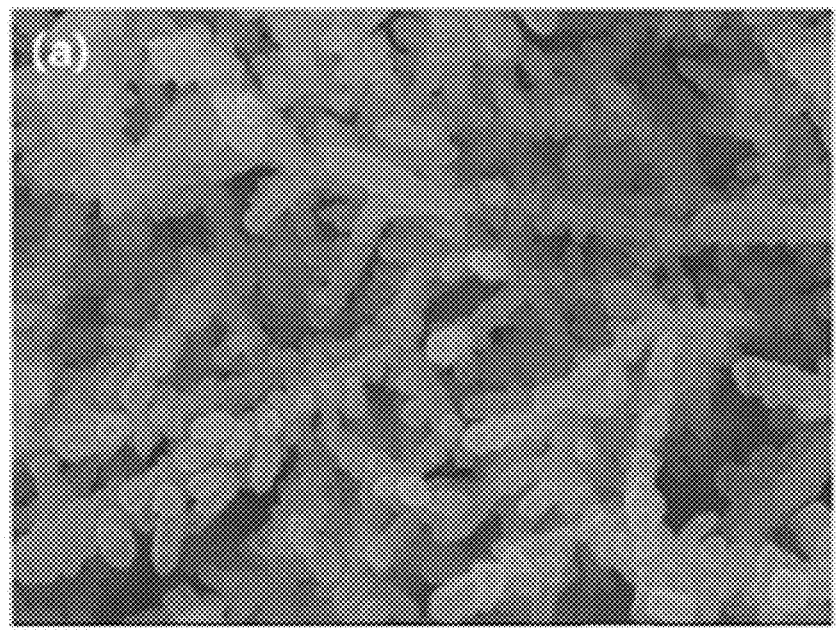
FIGS. 3A to 3D are SEM images showing a powder having a high surface area manufactured in Example 2 of the present invention.
Figure 3B:
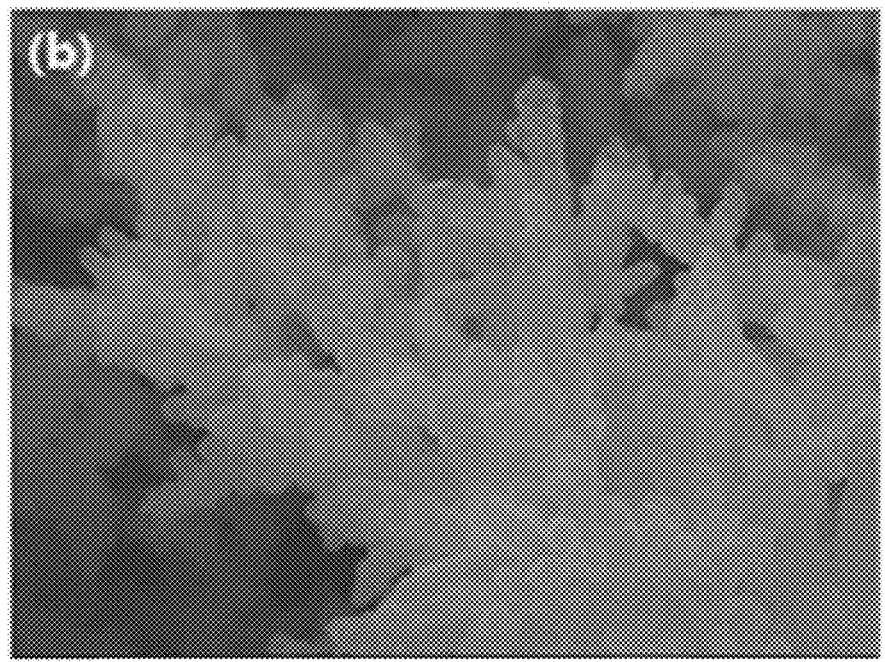
Figure 3C:
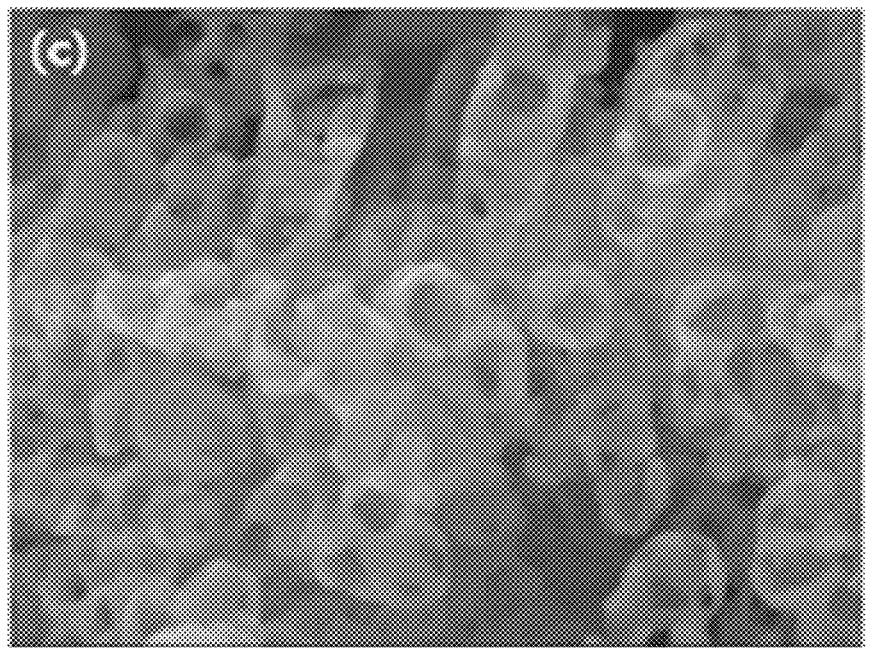
Figure 3D:
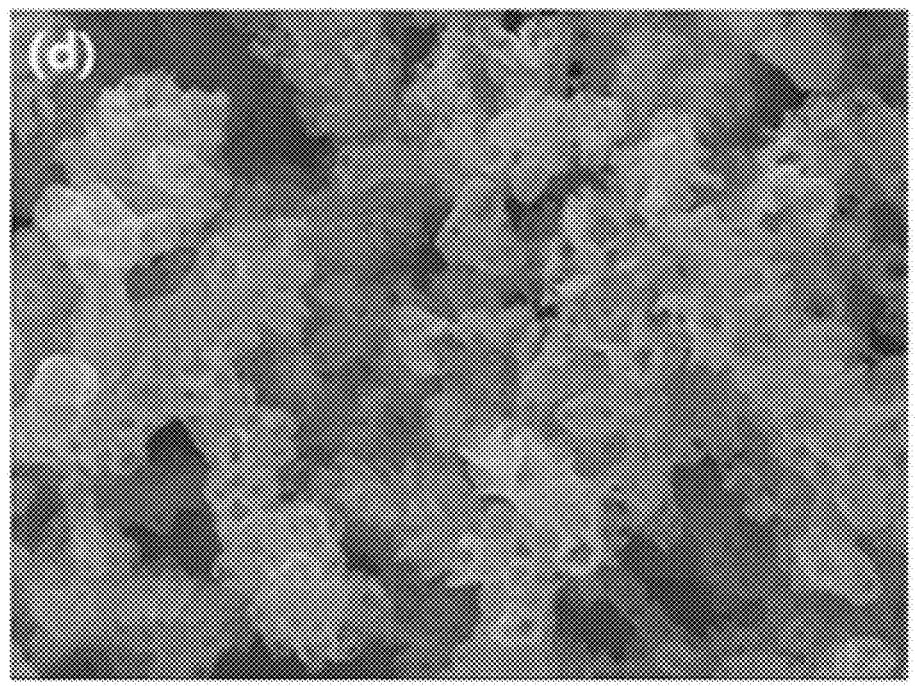

As shown in FIGS. 3A and 3B, it could be seen that the nickel/copper alloy powder electrode manufactured through the first spontaneous substitution process in the method as described above had a relatively high content of nickel components. As shown in FIGS. 3C and 3D, it could be seen that the electrode having a high specific surface area was formed, which had a porous structure in which the copper components were preferentially removed through the de-alloying process so that a plurality of pores were formed.

Figure 4A:
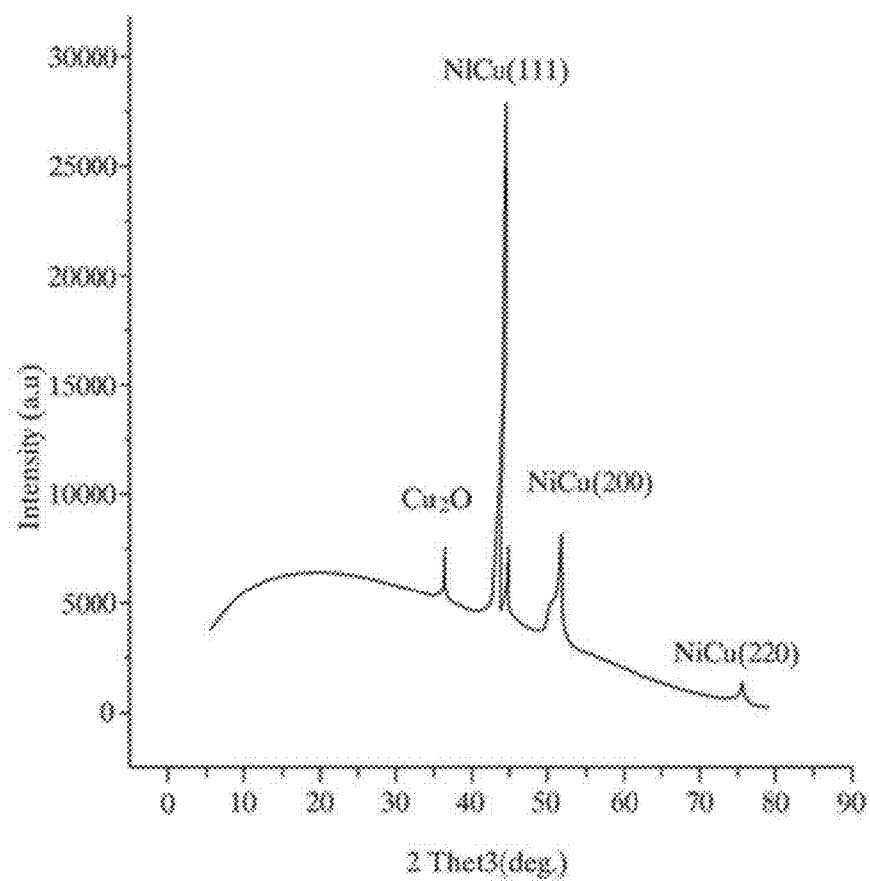
FIGS. 4A and 4B are X-ray diffraction graphs obtained by analyzing the powder having a high surface area manufactured in Example 2 of the present invention.
Figure 4B:
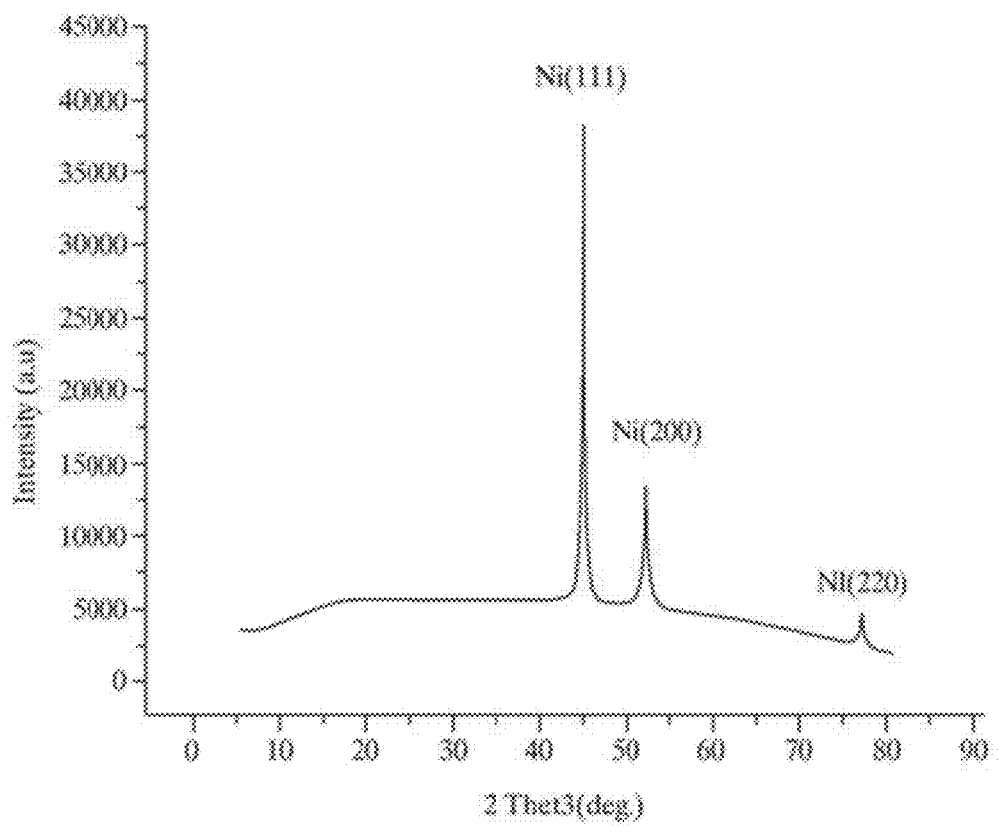

FIGS. 4A and 4B are X-ray diffraction graphs obtained by analyzing the powder having a high surface area manufactured in Example 2 of the present invention.

FIG. 4A shows an X-ray diffraction graph of the powder having a high surface area manufactured according to Example 2 of the present invention before the de-alloying process, and FIG. 4B shows an X-ray diffraction graph of the powder having a high surface area manufactured according to Example 2 of the present invention after the de-alloying process of removing copper from the powder having a high surface area.

Referring to FIGS. 4A and 4B, it could be seen that copper was removed from the powder having a high surface area through the de-alloying process.

Example 3: Manufacture of Powder Having a High Surface Area Using Nickel/Copper Alloy (III)

A power having a high surface area was manufactured in the same manner as in Example 2, except that an electrochemical separation process was used instead of the de-alloying process using sulfuric acid. More particularly, the nickel/copper alloy powder manufactured in Example 2 was attached to a conductive support, an oxidation/reduction reaction was repeatedly performed in a potential range of 0.0 to 1.0 in a 0.5 M to 1.0 M sulfuric acid solution (a specific concentration is not significant) using a working electrode, a counter electrode as a platinum plate, and an Ag/AgCl reference electrode. Also, the copper was able to be removed within a short period of time by continuously applying a voltage at which the copper was removed, for example, a voltage of 0.5 V. As a result, it was possible to partially remove the copper from the nickel/copper alloy through the electrochemical separation process.

Figure 5:
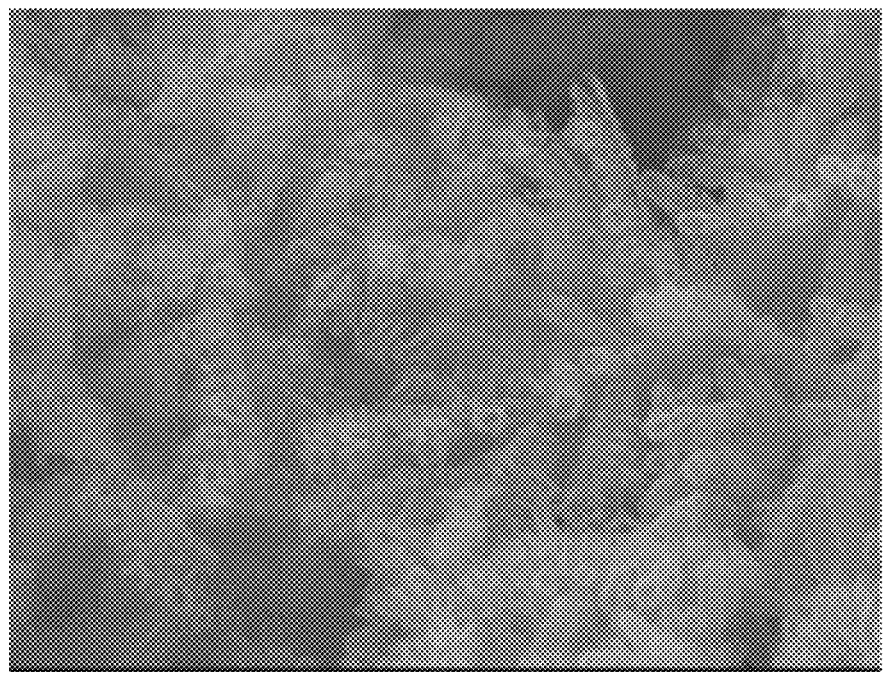
FIG. 5 is an SEM image showing a powder having a high surface area manufactured in Example 3 of the present invention.

FIG. 5 is an SEM image showing the powder having a high surface area manufactured in Example 3 of the present invention.

Referring to FIG. 5, it could be seen that the nickel/copper oxide powder having a high surface area manufactured through the de-alloying process was used to form an electrode having a tubular shape, a particle aggregate shape and a mixed shape thereof so that the nickel/copper oxide powder had a relatively high specific surface area.

Example 4: Manufacture of Powder Having a High Surface Area Using Nickel/Copper Alloy (IV)

A metal oxide film was able to be formed on a surface of the nickel/copper alloy powder using the nickel/copper alloy powder manufactured in Example 2 by injecting oxygen plasma into the surface of the alloy powder. In this case, oxygen ($O_2$) argon gases were supplied into a chamber at flow rates of 10 sccm and 7 sccm, respectively, and a process of injecting plasma ions was performed for 30 minutes at a power of 150 W.

Example 5: Manufacture of Powder Electrode Having a High Surface Area Using Nickel/Copper Alloy (1) 100 ml of a metal electrolyte including 0.2 M $NiCl_2 \cdot 6H_2O$, 0.01 M $SnCl_2 \cdot 2H_2O$ and 1 M $H_2SO_4$ was used to manufacture a powder having a high surface area.

(2) Aluminum foil had a thickness 0.13 μm and an area of 3.5 cm×3.5 cm, and an aluminum oxide film was removed in a NaOH solution for approximately 2 minutes.

(3) The pretreated aluminum foil was immersed in the metal electrolyte prepared thus in advance to manufacture a nickel/tin alloy powder having a tubular shape, a particle aggregate shape and a mixed shape thereof through the first spontaneous substitution reaction. Thereafter, the nickel/tin alloy powder was sequentially subjected to a washing process using distilled water, a filtering process of filtering a powder through a filter having a pore size of 200 nm, and a drying process of drying a powder at temperature of 70° C. for 12 hours or more in a vacuum oven, thereby manufacturing a nickel/tin alloy electrode having a high surface area.

Figure 6A:
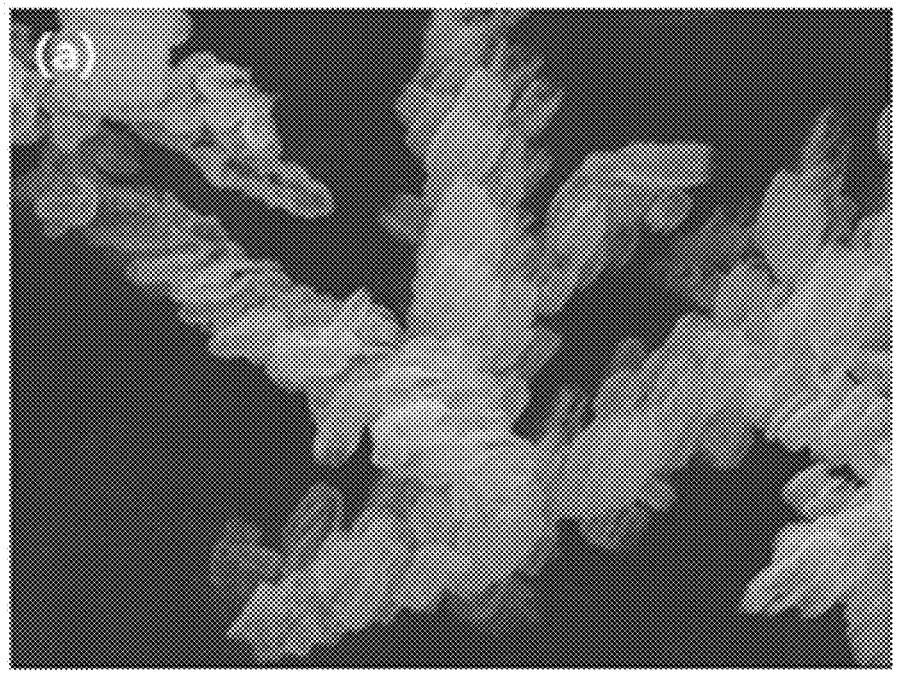
FIGS. 6A and 6B are SEM images showing a powder having a high surface area manufactured in Example 5 of the present invention.
Figure 6B:
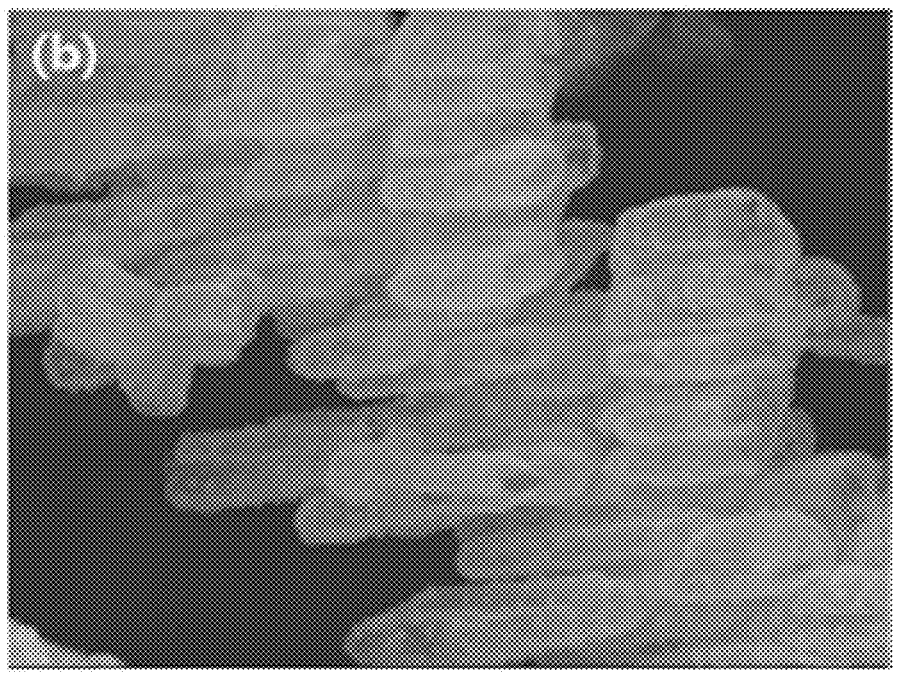

FIGS. 6A and 6B are SEM images showing the powder having a high surface area manufactured in Example 5 of the present invention.

Referring to FIGS. 6A and 6B, the nickel/tin alloy having a high surface area manufactured through the first spontaneous substitution reaction is shown. In this case, FIG. 6A shows an image with a magnification of 10,000×, and FIG. 6B shows an image with a magnification of 20,000×. As a result, it could be seen that the nickel/tin alloy powder electrode manufactured through the first spontaneous substitution reaction was formed to have a tubular shape, a particle aggregate shape and a mixed shape thereof so that the nickel/tin alloy powder electrode had a relatively high specific surface area.

Example 6: Manufacture of Powder Electrode Having a High Surface Area Using Ruthenium/Copper Alloy (1) 100 ml of an electrolyte including 00.2 M $RuCl_3 \cdot 2H_2O$, 0.01 M $CuSO_4 \cdot 5H_2O$ and 1 M $H_2SO_4$ was used to manufacture a powder electrode having a high surface area.

(2) Aluminum foil had a thickness 0.13 μm and an area of 3.5 cm×3.5 cm, and an aluminum oxide film was removed in a NaOH solution for approximately 2 minutes.

(3) The pretreated aluminum foil was immersed in the electrolyte prepared thus in advance to manufacture a ruthenium/copper alloy powder having a dendritic shape and a particle aggregate shape through the first spontaneous substitution reaction. Thereafter, the ruthenium/copper alloy powder was sequentially subjected to a washing process using distilled water, a filtering process of filtering a powder through a filter having a pore size of 200 nm, and a drying process of drying a powder at temperature of 70° C. for 12 hours or more in a vacuum oven, thereby manufacturing a ruthenium/copper alloy electrode having a dendritic shape and a particle aggregate shape.

FIGS. 7A to 7D are SEM images showing the ruthenium/copper alloy metal electrode manufactured in Example 6 of the present invention.

Figure 7A:
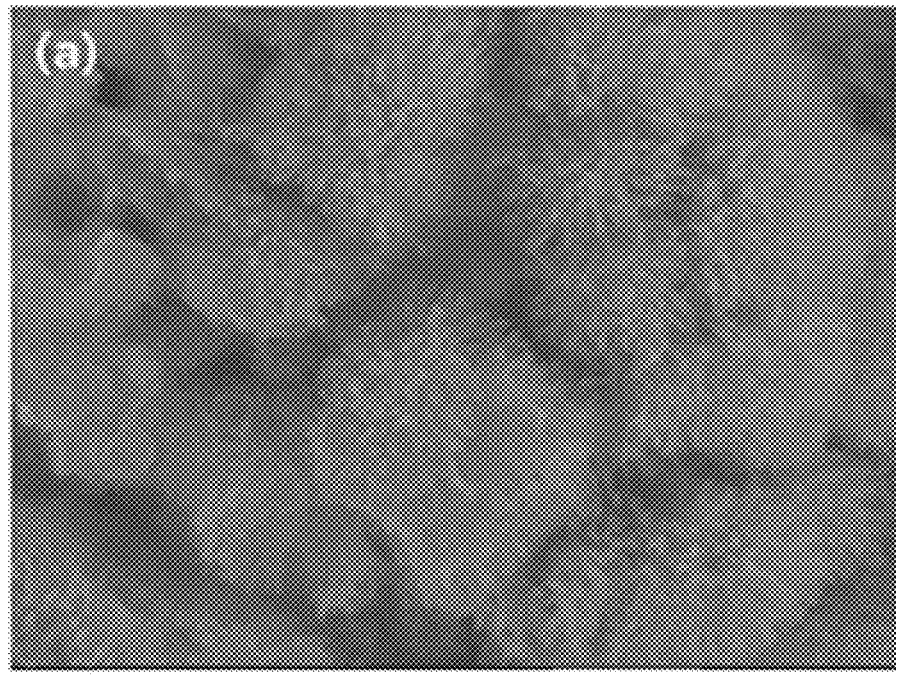
FIGS. 7A to 7D are SEM images showing a ruthenium/copper alloy metal electrode manufactured in Example 6 of the present invention.
Figure 7B:
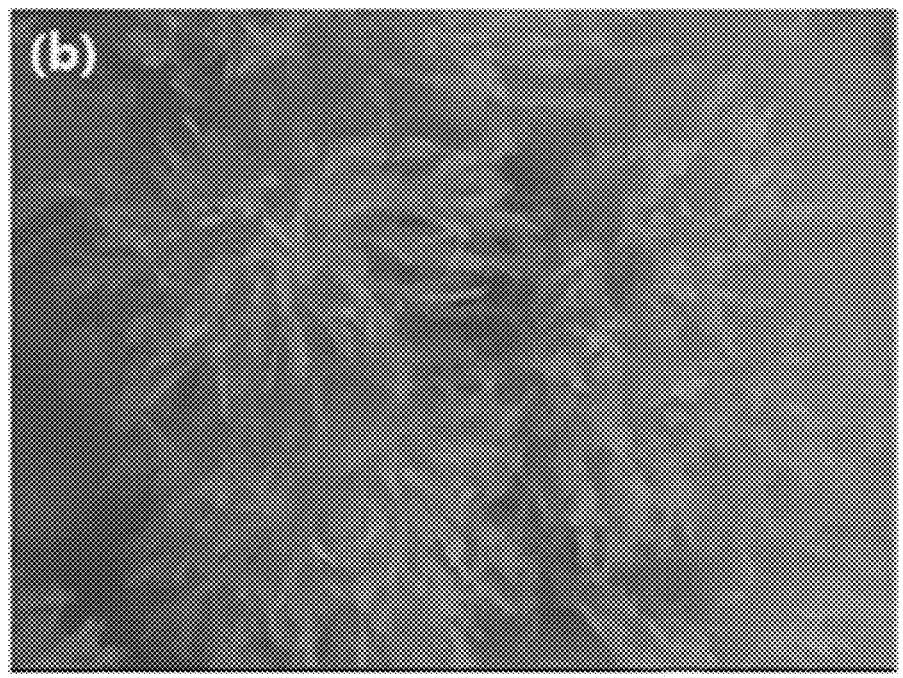
Figure 7C:
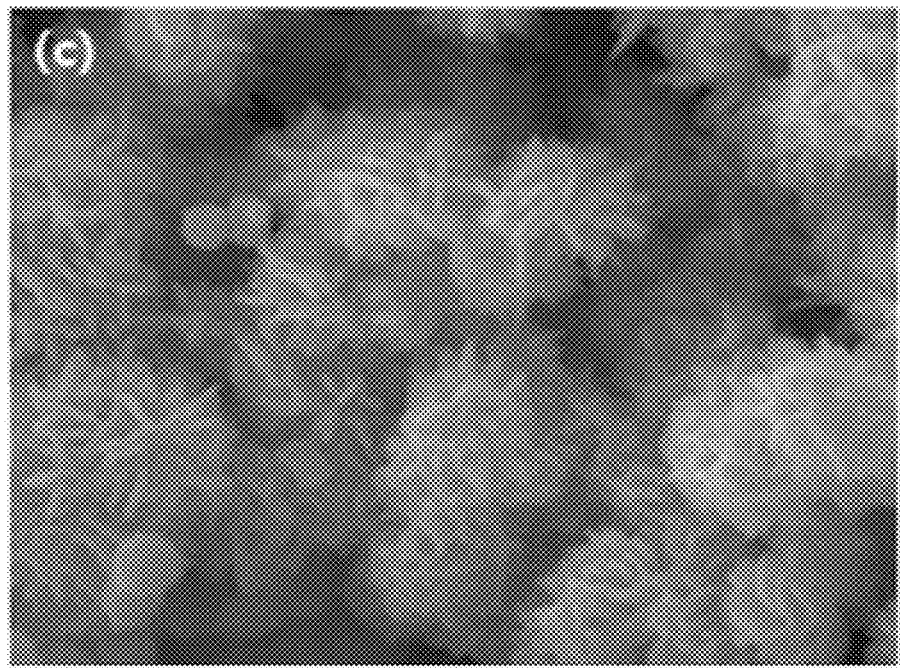
Figure 7D:
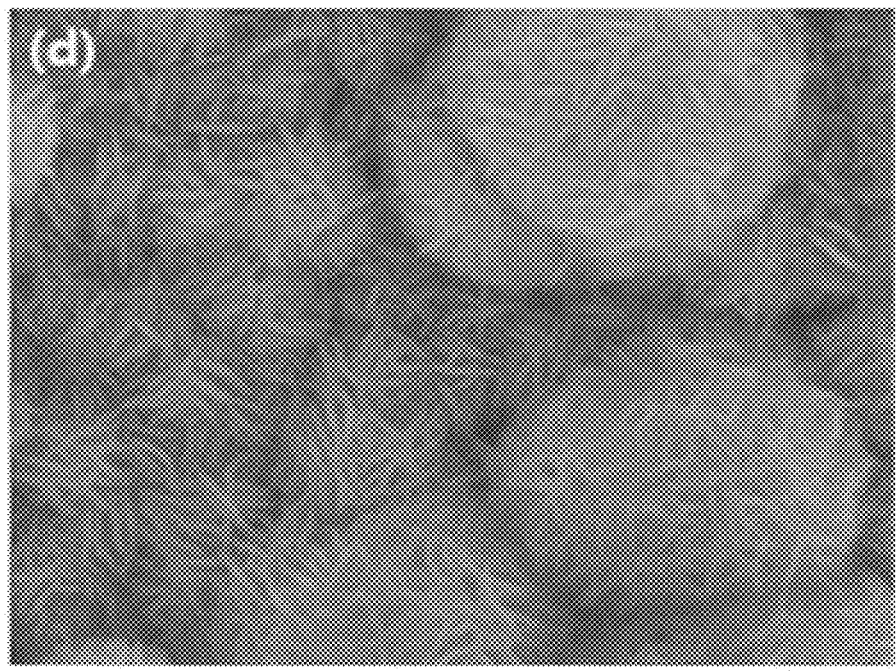

Referring to FIGS. 7A to 7D, FIGS. 7A and 7B show the dendritic and particle aggregate-shaped ruthenium/copper alloy powder having a relatively high copper content, and FIGS. 7C and 7D show the dendritic and particle aggregate-shaped ruthenium/copper alloy powder having a relatively low copper content. As a result, it could be seen that the dendritic and particle aggregate-shaped ruthenium/copper alloy powder manufactured in Example 6 of the present invention was configured to have an improved specific surface area.

Example 7: Manufacture of Silver (Ag)-Plated Nickel/Tin Alloy Powder Electrode A nickel/tin alloy powder electrode having a high surface area was manufactured in the same manner as in Example 5. Thereafter, a coated nickel/tin alloy powder electrode having a core/shell structure and a high surface area was manufactured through the second spontaneous substitution reaction. In this case, the second spontaneous substitution reaction was a surface coating method using a difference in potentials of a nickel/tin alloy and a silver (Ag) metal. To substitute a surface of the nickel/tin alloy with silver, silver nitrate ($AgNO_3$) was further dissociated in the metal electrolyte to form silver ions. In this case, the mass ratios of the nickel/tin alloy and silver (Ag) were able to be adjusted. For example, the nickel/tin alloy powder electrode was manufactured using 0.15 g of silver nitrate ($AgNO_3$) at a mass ratio of approximately nickel/tin alloy:silver (Ag)=8:2.

Subsequently, the high surface area nickel/tin alloy and the powder having a core/shell structure surrounding the alloy were washed with distilled water, filtered through a filter having a pore size of 200 nm, and then dried at a temperature of 70° C. for 12 hours in a vacuum oven to manufacture a metal electrode having a high surface area, which had a core/shell structure.

Figure 8:
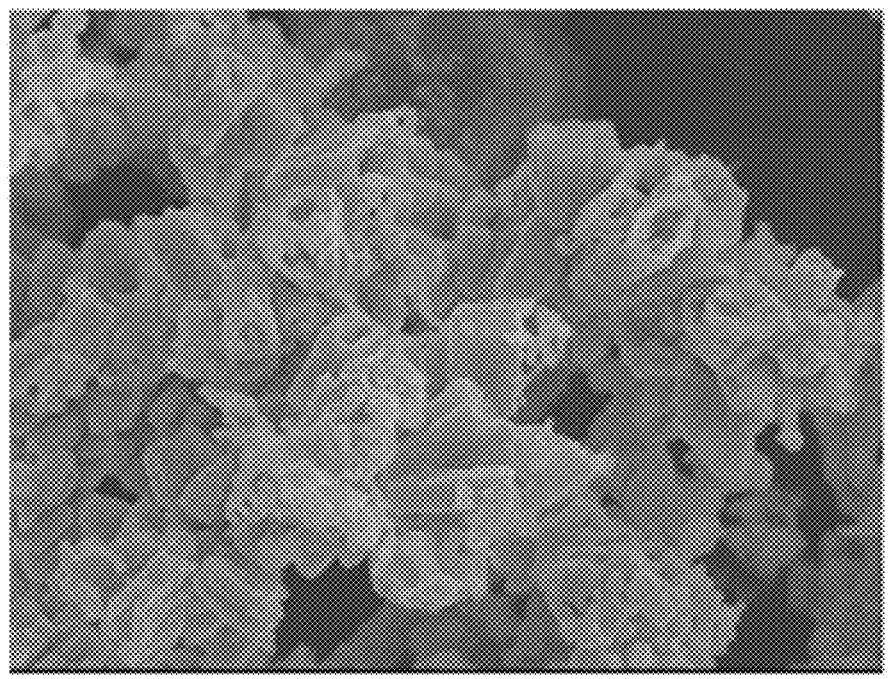
FIG. 8 is an SEM image showing a powder having a high surface area manufactured in Example 7 of the present invention, which has a core/shell structure.

FIG. 8 is an SEM image showing the metal electrode having a high surface area, which has a core/shell structure, as manufactured in Example 7 of the present invention, which has a core/shell structure.

Referring to FIG. 8, it could be seen that the metal electrode having a high surface area, which had a core/shell structure, as manufactured in Example 7 of the present invention was formed in a tubular shape, a particle aggregate shape and a mixed shape thereof such that metal electrode had an improved specific surface area.

Experimental Example 1: Cyclic Voltammetry Measurement Using Nickel/Tin Powder Electrode Cyclic voltammetry were performed on the nickel/tin electrode having a high surface area manufactured in Example 5 (Electrochemical Impedance Analyzer, ZAHNER). In this case, a working electrode was manufactured, as follows. The nickel/tin powder electrode having a high surface area and a binder, polyvinylidene fluoride (PVDF), were mixed at a mixing ratio of 95:5, and converted into an aqueous solution state using dimethylformamide (DMF). The aqueous electrode solution prepared in the method was coated several times using a nickel mess as a support. Thereafter, the aqueous electrode solution was kept at a temperature of 80° C. and a pressure of 40 MPa for 3 minutes. The electrode medium manufactured thus was subjected to an oxidization process in which the electrode medium was annealed at a temperature of 200° C. for 10 hours so as to form a metal oxide. In this measurement method, the electrode medium manufactured thus was measured in a 1 M KOH electrolyte at a rate of 50 mV/s using a working electrode, a platinum plate as a counter electrode, and a Hg/HgO reference electrode.

Figure 9:
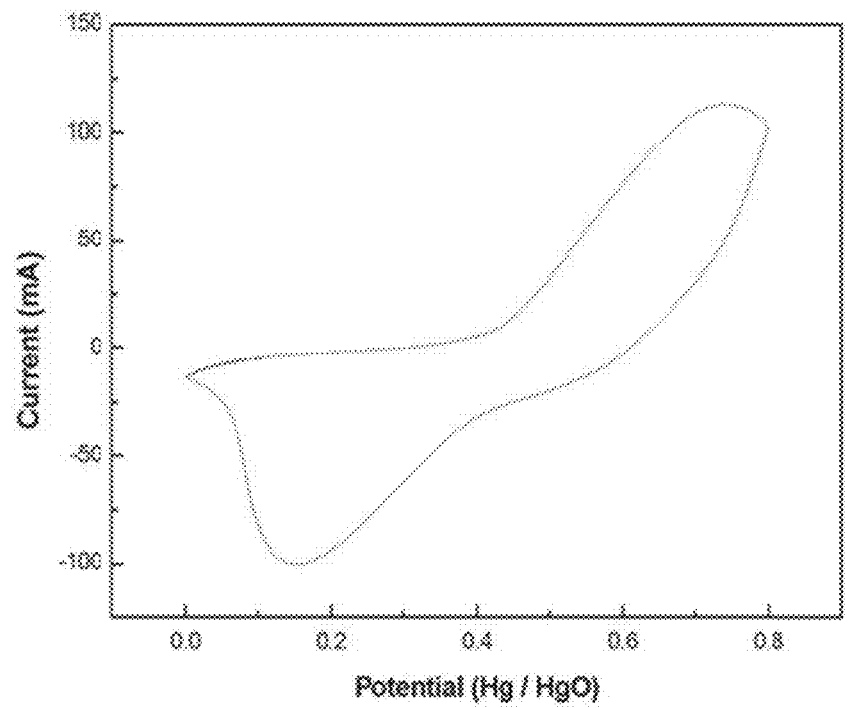
FIG. 9 is a graph illustrating the cyclic voltammetry test results of an electrode prepared using the powder having a high surface area manufactured in Example 2 of the present invention.

FIG. 9 is a graph illustrating the cyclic voltammetry test results of the electrode prepared using the metal powder having a high surface area manufactured in Example 2 of the present invention.

Referring to FIG. 9, it could be seen that the electrode manufactured using the metal powder having a high surface area manufactured in Example 2 of the present invention has stable electrical characteristics.

Experimental Example 2: Measurement of Charging/Discharging Performance of Nickel/Copper Powder Electrode The charging/discharging performance of the nickel/copper powder electrode having a high surface area manufactured in Example 2 was measured (Electrochemical Impedance Analyzer, ZAHNER). In this measurement method, the electrode medium manufactured in the same manner as in Experimental Example 1 was measured in a 1 M KOH electrolyte at an electric current of 1.0 mA and a potential of 0.0 to 0.5 V using a working electrode, a platinum plate as a counter electrode, and a Hg/HgO reference electrode.

Figure 10:
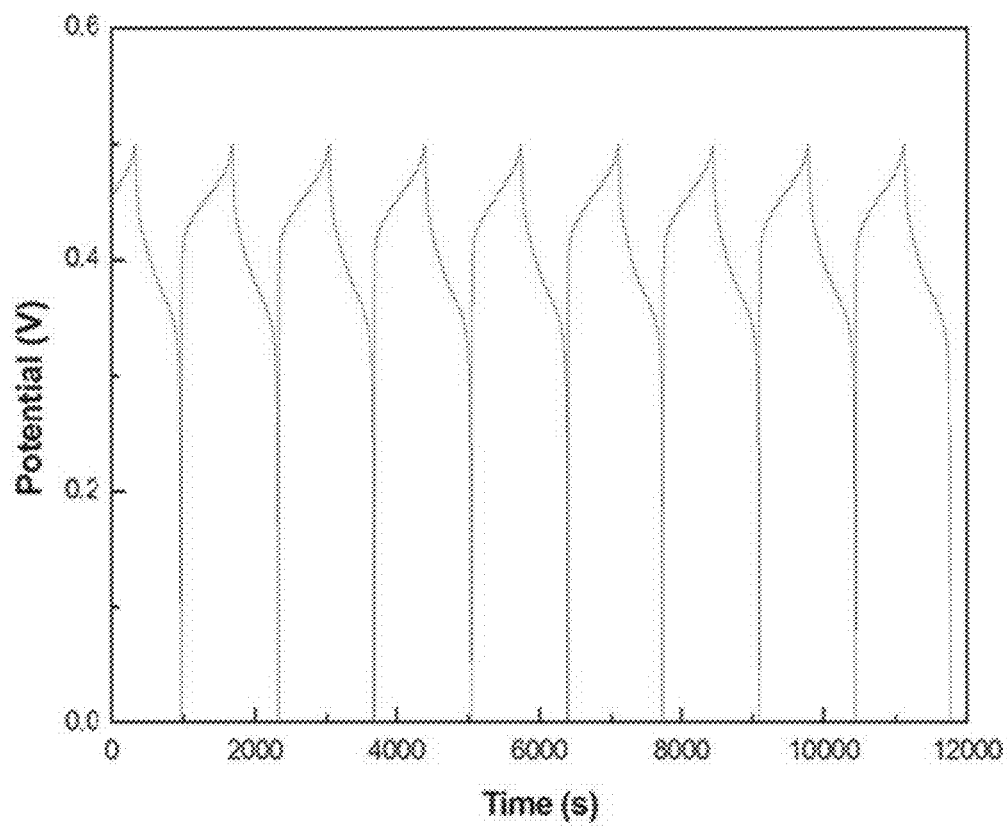
FIG. 10 is a graph illustrating the charging/discharging test results of the electrode prepared using the powder having a high surface area manufactured in Example 2 of the present invention.

FIG. 10 is a graph illustrating the charging/discharging test results of the electrode manufactured using the metal powder having a high surface area manufactured in Example 2 of the present invention.

Referring to FIG. 10, it could be seen that the electrode manufactured using the metal powder having a high surface area manufactured in Example 2 of the present invention had stable electrical characteristics.

Experimental Example 3: Measurement of Charging/Discharging Performance of Lithium Battery Using Nickel/Tin Powder Electrode Having a High Surface Area The charging/discharging performance of the nickel/tin powder electrode having a high surface area manufactured in Example 5 was measured (Electrochemical Impedance Analyzer, ZAHNER). This experiment was performed to apply the nickel/tin powder electrode to lithium secondary batteries, and a shell was prepared, as follows. The nickel/tin powder electrode manufactured in the same manner as in Experimental Example 1 was attached to copper foil, and used as a cathode, and lithium metal foil was used as an anode. In this case, a mixture obtained by mixing ethylene carbonate and dimethyl carbonate at a mixing ratio of 1:1 was used as an organic solvent, and a lithium salt, $LiPF_6$, was used as the electrolyte. From the experimental results, it was revealed that the nickel/tin powder electrode had a performance of approximately 600 $mAhg^{-1}$, as listed in the graph of FIG. 11.

Figure 11A:
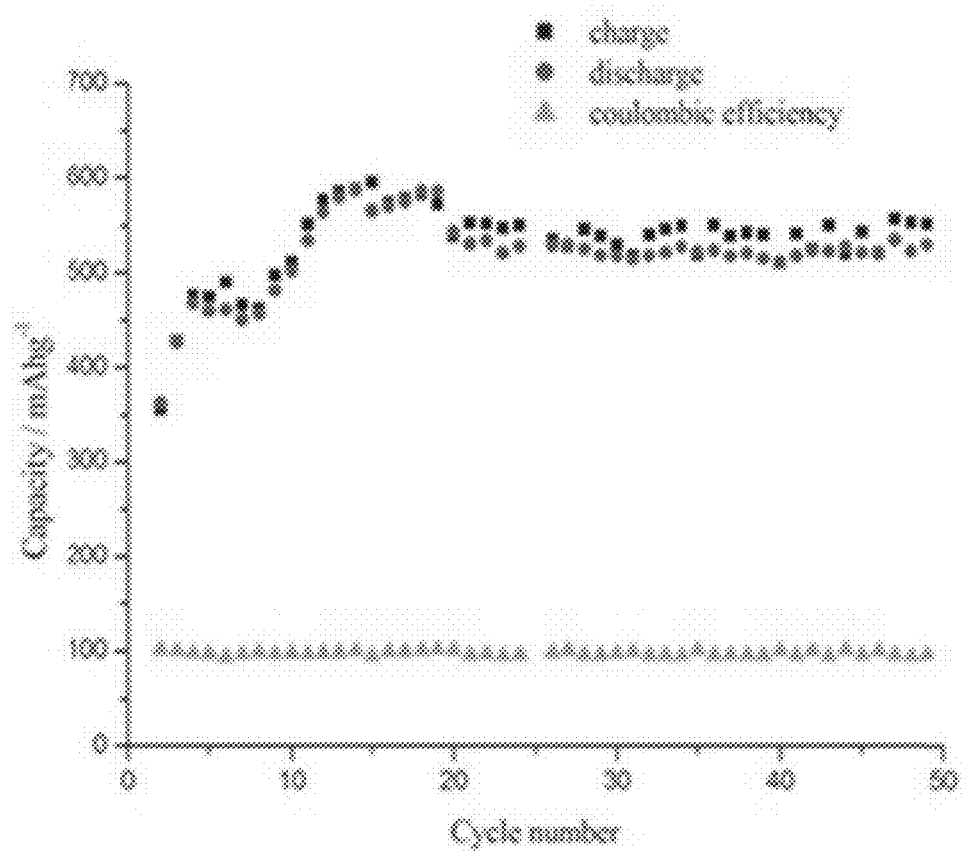
FIG. 11 is a graph illustrating the charging/discharging test results of a lithium battery including the electrode prepared using the powder having a high surface area manufactured in Example 3 of the present invention.
Figure 11B:
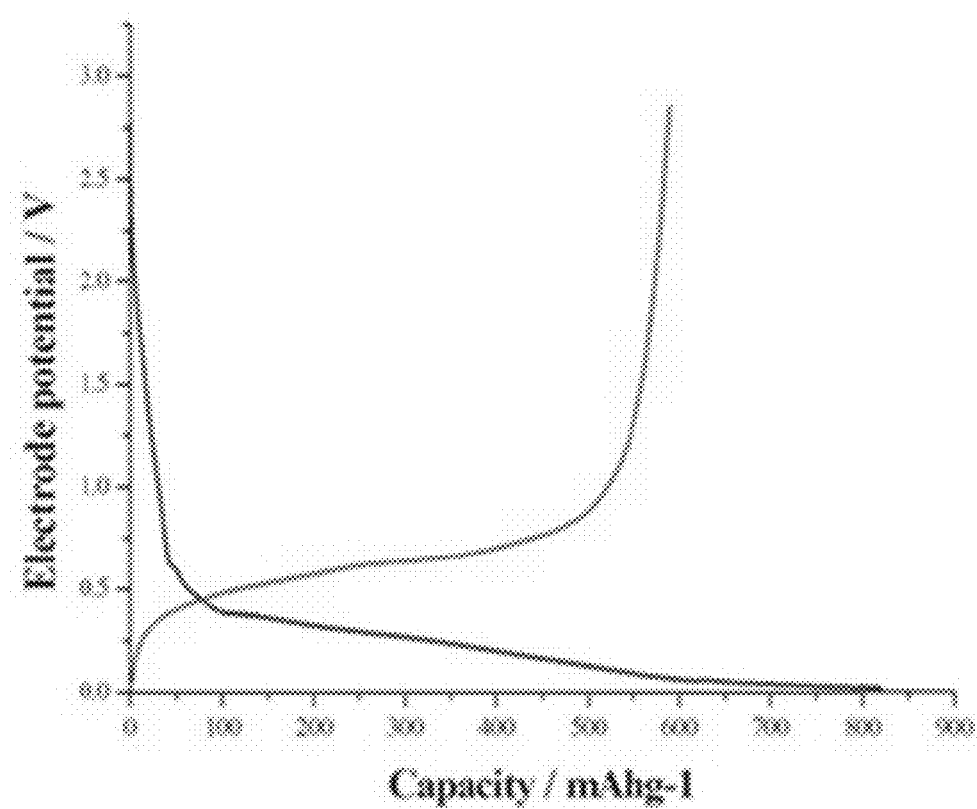

FIG. 11 is a graph illustrating the charging/discharging test results of a lithium battery including an electrode prepared using the metal powder having a high surface area manufactured in Example 5 of the present invention.

Referring to FIG. 11, it could be seen that the electrode manufactured using the powder having a high surface area manufactured according to Example 5 of the present invention showed stable electric characteristics.

According to the method of manufacturing a powder having a high surface area according to the present invention, a powder having a high surface area, which has an improved specific surface area, can be manufactured in a relatively short processing time through simple processes by manufacturing electrodes through a spontaneous substitution reaction using a difference in reducing power of metals and a reaction activation process using other materials formed in an electrolyte containing chloride ions. Accordingly, the powder having a high surface area can be used in large-scale and flexible substrates, and can also be useful in improving the charging/discharging capacity, energy density and output density of a super-capacitor through an increase in specific surface areas of metals. Also, the powder having a high surface area can have an effect of maximizing use in other fields including lithium secondary batteries, fuel cells, solar cells, electromagnetic wave shielding and absorbing agents, and sensors.

The present invention has been described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

What is claimed is:

1. A method of manufacturing a powder having a high surface area, comprising:
    preparing a metal electrolyte which includes different first metals and in which metal ions are dissociated; and
    extracting an alloy powder formed of the first metals by soaking a second metal having a higher reducing power than the first metals in the metal electrolyte to induce a first spontaneous substitution reaction.

2. The method of claim 1, wherein the metal electrolyte contains chloride ions.

3. The method of claim 2, wherein the preparing of the metal electrolyte comprises:
    preparing metal chlorides, each of which include the different first metals; and dissociating the metal chlorides in a first solution.

4. The method of claim 2, wherein the preparing of the metal electrolyte comprises:
    preparing the different first metals; and
    dissociating the first metals in a second solution in which the chloride ions are dissociated.

5. The method of claim 4, wherein the second solution is prepared by dissociating sodium chloride, ammonium chloride, hydrochloric acid or a mixture thereof in deionized water.

6. The method of claim 1, further comprising:
    removing at least one of the first metals from the alloy powder.

7. The method of claim 6, wherein the metal electrolyte contains a strong acid, and the removing of the at least one of the first metals from the alloy powder comprises allowing the at least one of the first metals to react with the strong acid.

8. The method of claim 6, further comprising:
    drying the alloy powder,
    wherein the removing of the at least one of the first metals from the alloy powder comprises allowing the dried alloy powder to react with a strong acid.

9. The method of claim 6, further comprising:
    drying the alloy powder,
    wherein the removing of the at least one of the first metals from the alloy powder comprises subjecting the dried alloy powder to an electrochemical process.

10. The method of claim 1, further comprising:
    mixing an additive for improving a structure and directionality of the alloy powder and modifying a surface of the alloy powder with the metal electrolyte.

11. The method of claim 10, wherein the additive comprises at least one of the group consisting of polyoxometalate (POM), vanadyl sulfate (VOSO4), polyvinylpyrrolidone, acetic acid, hexadecyltrimethylammonium bromide (CTAB), polydiallyldimethylammonium chloride (PDDA), sodium dodecyl sulfate (SDS), and a mixture thereof.

12. The method of claim 1, wherein the different first metals contain at least two selected from the group consisting of copper, zinc, titanium, nickel, lead, tin, manganese, cobalt, ruthenium, vanadium, gold, silver and platinum, and the second metal contains aluminum.

13. The method of claim 1, wherein the second metal is soaked in the metal electrolyte in the form of a thin film or powder.

14. The method of claim 1, further comprising:
preparing a third solution in which a third metal having a lower reducing power than the first metals is dissociated; and
forming a core/shell metal material in which the alloy powder formed of the first metals is surrounded by the third metal by soaking the alloy powder in the third solution to induce a second spontaneous substitution reaction between the third metal and the first metals.

15. The method of claim 1, further comprising:
forming a metal oxide layer on a surface of the alloy powder.

16. The method of claim 15, wherein the forming of the metal oxide layer comprises:
thermally treating the alloy powder under an oxygen atmosphere.

17. The method of claim 15, wherein the forming of the metal oxide layer is performed by injecting oxygen ions in a plasma phase into the alloy powder.

18. The method of claim 1, wherein the alloy powder has a dendritic shape, a tubular shape, a needle-type shape, or a mixed shape thereof.

* * * * *